(12) United States Patent
Khare (10) Patent No.: US 9,288,550 B2
(45) Date of Patent: *Mar. 15, 2016

(54) METHOD AND SYSTEM FOR INTEGRATED MEDIA PLANNING AND AUTOMATED ADVERTISEMENT DISTRIBUTION AND INSERTION

(75) Inventor: Rajendra Kumar Khare, Bangalore (IN)

(73) Assignee: SUREWAVES MEDIATECH PRIVATE LIMITED, Karnataka (IN)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,485

(22) Filed: Aug. 9, 2011

(65) Prior Publication Data

US 2013/0191864 A1    Jul. 25, 2013

(30) Foreign Application Priority Data

Aug. 9, 2010  (IN) ............................ 2284/CHE/2010

(51) Int. Cl.
| | |
|---|---|
| H04N 7/10 | (2006.01) |
| H04N 7/025 | (2006.01) |
| H04N 21/81 | (2011.01) |
| H04N 21/262 | (2011.01) |
| H04N 21/2668 | (2011.01) |
| H04N 21/234 | (2011.01) |

(52) U.S. Cl.
CPC ......... *H04N 21/812* (2013.01); *H04N 21/2668* (2013.01); *H04N 21/26241* (2013.01); *H04N 21/23424* (2013.01)

(58) Field of Classification Search
CPC .......... H04N 21/812; H04N 21/23424; H04N 21/2668; H04N 21/23418; H04N 21/4331; H04N 21/44008; H04N 21/44016; H04N 21/23; H04N 21/2407; H04N 21/2547; H04N 21/26241; H04N 21/64761; H04N 21/2221; H04N 21/435; G06Q 30/0241; G06Q 30/0243; G06Q 30/0244; G06Q 30/0251; G06Q 30/0261; G06Q 30/0242; H04H 20/14; H04H 60/375
USPC ........... 725/40, 42, 46, 67, 82, 136, 138, 144, 725/14, 32–36; 705/14, 14.43

See application file for complete search history.

(56) References Cited

U.S. PATENT DOCUMENTS

| | | | | |
|---|---|---|---|---|
| 7,694,318 | B2 * | 4/2010 | Konig et al. ................... | 725/32 |
| 8,826,319 | B2 * | 9/2014 | Khare ............................. | 725/22 |
| 2002/0100041 | A1 * | 7/2002 | Rosenberg et al. ............ | 725/32 |

(Continued)

*Primary Examiner* — Benjamin R Bruckart
*Assistant Examiner* — Jen-Shi Huang
(74) *Attorney, Agent, or Firm* — Barry Choobin (57) ABSTRACT

A system and method for integrating a media plan and a targeted advertisement into a television or a radio channel. The system includes a user interface for receiving a media plan and a television program schedule. The system also includes a media server to integrate the television program schedule and the targeted advertisement based on the media plan and to generate a Mark-in and a Mark-out montage. The system further includes one or more edge devices for fetching the targeted advertisement, detecting the Mark-in and the Mark-out montage and inserting the targeted advertisement into the television channel. The method includes receiving a media plan from an advertiser. The method also includes selecting a television channel by the advertiser. The method further includes scheduling of a targeted advertisement. Furthermore, the method includes fetching and inserting the targeted advertisement for playing on the television channel based on the media plan.

13 Claims, 3 Drawing Sheets

(56) References Cited

U.S. PATENT DOCUMENTS

| | | | |
|---|---|---|---|
| 2004/0128682 A1* | 7/2004 | Liga et al. | 725/35 |
| 2004/0194130 A1* | 9/2004 | Konig et al. | 725/32 |
| 2007/0156525 A1* | 7/2007 | Grouf et al. | 705/14 |
| 2008/0046919 A1* | 2/2008 | Carmi et al. | 725/32 |
| 2008/0228572 A1* | 9/2008 | Teterin | 705/14 |
| 2010/0083303 A1* | 4/2010 | Redei et al. | 725/32 |
| 2010/0235219 A1* | 9/2010 | Merrick et al. | 705/10 |
| 2010/0241511 A1* | 9/2010 | Cunningham et al. | 705/14.46 |
| 2010/0313218 A1* | 12/2010 | Niemeijer et al. | 725/35 |
| 2011/0078718 A1* | 3/2011 | Jakobi et al. | 725/14 |
| 2011/0119125 A1* | 5/2011 | Javangula et al. | 705/14.43 |
| 2013/0160045 A1* | 6/2013 | Khare | 725/32 |
| 2013/0191865 A1* | 7/2013 | Khare | 725/36 |
| 2013/0191866 A1* | 7/2013 | Khare | 725/36 |

* cited by examiner

METHOD AND SYSTEM FOR INTEGRATED MEDIA PLANNING AND AUTOMATED ADVERTISEMENT DISTRIBUTION AND INSERTION

This application claims priority from Indian Provisional Application Serial No. 2284/CHE/2010 filed on Aug. 9, 2010 entitled "METHOD AND SYSTEM FOR INTEGRATED MEDIA PLANNING AND AUTOMATED ADVERTISEMENT DISTRIBUTION", which is hereby incorporated in its entirety.

TECHNICAL FIELD

Embodiments of the disclosure relate to the field of advertising and more specifically to the field of advertising on television and radio.

BACKGROUND

Distributing an advertisement on a television, radio or on a World Wide Web is being widely utilized by advertisers for advertising their products and services. One of the methods for distributing the advertisement such that it reaches out to maximum number of users includes media planning. Media planning is used to determine an appropriate platform for playing the advertisement and achieving the desired marketing objectives of the products and services. Examples of platform include, but not limited to, various media such as newspapers, magazines, television, radio public transportation, direct mail, catalogs, samples, brochures and type of advertising. Though standalone tools may be used for media planning, the tools do not provide for inserting advertisements based on the media plan.

Another method for advertising is achieved by over laying a banner advertisement on a television program. The banner advertisement can be regarded as an advertisement for advertising products and services on the television. The banner advertisement is displayed along with the television program. Hence, the users watching the television program can also view the banner advertisement. Further, the banner advertisement can also be linked to a website and can be displayed, when the user browses the website. Television studios utilize a combination of standalone tools and play-out softwares for embedding the banner advertisement into a television channel while broadcasting the television program. However, the technique does not allow embedding of the banner advertisement automatically from a remote location.

In the light of the foregoing discussion, there is a need for a method and a system for an efficient technique of advertising.

SUMMARY

The above-mentioned needs are met by a system and a method for integrating a media plan and a targeted advertisement into a television channel.

An example of a system includes a user interface for receiving a media plan from an advertiser and a television program schedule from a studio editor. The system also includes a media server. The media server includes a memory and a processor, in responsive to the instructions, to integrate the television program schedule and the targeted advertisement based on the media plan and to generate a Mark-in and a Mark-out montage to match a duration of one or more targeted advertisements to be inserted within a television program channel. The system further includes one or more edge devices for fetching the targeted advertisement, detecting the Mark-in and the Mark-out montage to synchronize the insertion of the one or more targeted advertisements within a television content of the television program channel and inserting the targeted advertisement into a television channel. The one or more edge devices are further used to insert an audio advertisement on a radio channel dynamically.

A method of integrating a media plan and a targeted advertisement into a television channel includes receiving a media plan from an advertiser. The method also includes selecting a television channel by the advertiser. The method further includes scheduling a targeted advertisement for distribution on the television channel. Further, the method includes fetching the targeted advertisement. Furthermore, the method includes inserting the targeted advertisement for playing on the television channel based on the media plan. Moreover, the method includes integrating the media plan and an audio advertisement into a radio channel.

DETAILED DESCRIPTION OF THE EMBODIMENTS

The above-mentioned needs are met by a system and a method for integrating a media plan and a targeted advertisement into a television or a radio channel. The following detailed description is intended to provide example of implementations to one of ordinary skill in the art, and is not intended to limit the invention to the explicit disclosure, as one or ordinary skill in the art will understand that variations can be substituted that are within the scope of the invention as described.

Figure 1:
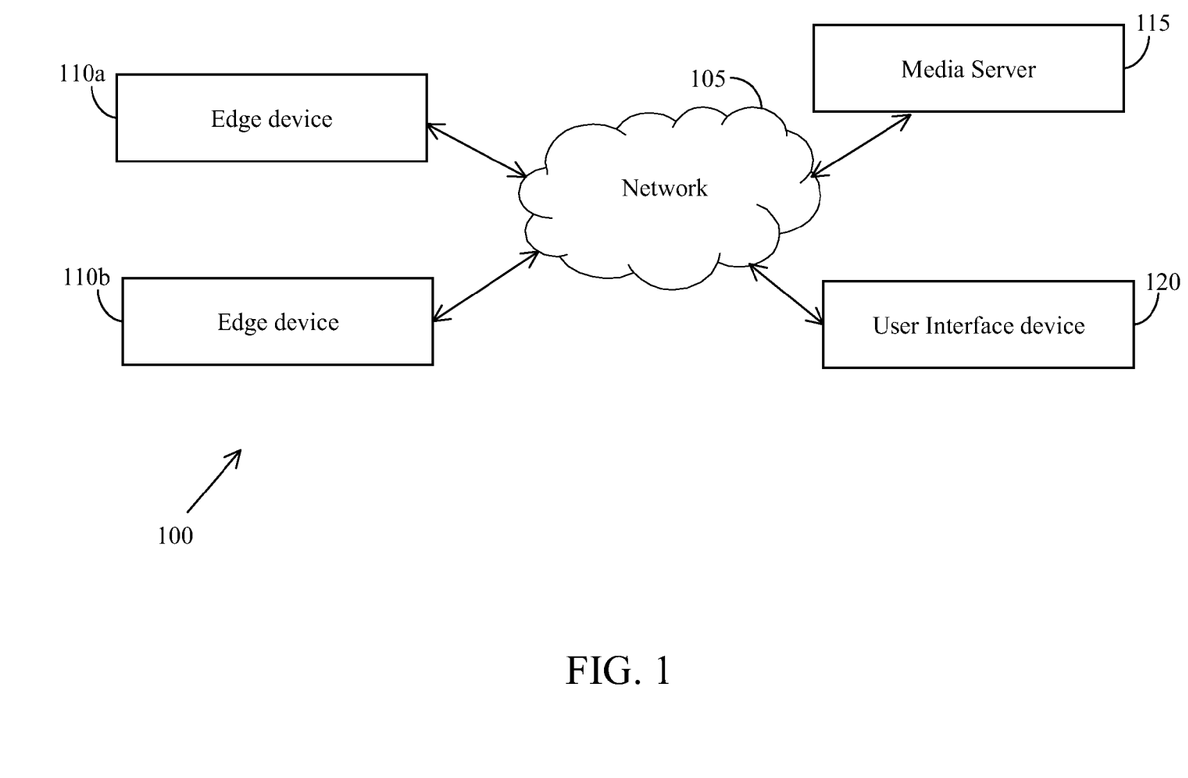
FIG. 1 is a block diagram of a system environment, in accordance with which various embodiments can be implemented.

FIG. 1 is a block diagram of a system environment 100, in accordance with which various embodiments can be implemented.

The system environment 100 includes one or more edge devices, such as an edge device 110a and an edge device 110b, connected to the network 105. The environment 100 also includes a user interface device 120 connected to the network 105. Examples of the user interface device 120 include, but are not limited to, computers, mobile devices, laptops, palmtops, hand held devices, telecommunication devices and personal digital assistants (PDAs). The environment 100 also includes a media server 115 connected to the network 105.

The media server 115 is in electronic communication with the edge device 110a, the edge device 110b and the user interface device 120 through the network 105. Examples of the network 105 include, but are not limited to, a Local Area Network (LAN), a Wireless Local Area Network (WLAN), a Wide Area Network (WAN), internet, and a Small Area Network (SAN). The media server 115 can be located remotely with respect to the one or more edge devices and the user interface device 120.

The media server 115 can be regarded as a platform for integrating one or more targeted advertisements and a television content based on a media plan. The media server 115 also provides a platform for integrating one or more audio advertisements on a radio channel. The targeted advertisements for distribution are obtained based on a television program genre, geographical area, a television channel, a radio channel, a distribution area, availability of an advertisement based on the number of exposures required, day-parts, days of the week and calendar days. The media server 115 further includes a combination of one or more advertisement servers and one or more content servers that may be connected to the media server 115 locally or remotely over the network. The one or more advertisement servers are used to store multiple advertisements. The one or more content servers are used to store various television contents that can be aired on various television channels. The media server 115 is also operable to store user profiles and media plans associated with users. The media server 115 further provides a reporting platform for reporting to an advertiser the one or more advertisements that are played. The media server 115 can be laid on a cloud network for providing an increased scalability, availability and accessibility to the advertiser. The advertiser, for example, a local advertiser or a national advertiser can also access the media server 115 through an internet portal. The media server 115 can also be used by the advertiser to insert a video advertisement and a banner advertisement on a television channel. Further, the media server 115 enables an insertion of the audio advertisement on the radio channel. The television or radio channel, in which the advertisements are played, is chosen based on a geographical location, where the television or the radio channel is distributed, programming genre, advertisement availability based on the number of insertions required, day—parts, days of the week and calendar days. Hence the media server 115 serves as an intelligent interface between the advertiser (local advertiser/national advertiser) and the television or the radio channel to play a relevant advertisement on the television or the radio channel to create additional revenue opportunities.

The media server 115 also enables scheduling of the one or more advertisements that can be played on selected television or radio channels. The scheduling helps to identify one or more needs of the users for playing relevant advertisements and thus improving viewership or listenership ratings. The media server 115 also enables scheduling of one or more banner advertisements that can be over-laid on the television content on the selected positions of the television screen.

In some embodiments, the elements described in FIG. 1 can also be used to insert an audio advertisement into a radio channel based on the media plan.

The media server 115 also controls the one or more edge devices that are deployed at one or more distributing stations. The media server 115 further maintains one or more program information that can be played on one or more television or radio channels. The media server 115 also performs an automatic management of the one or more advertisements to match an order booking placed by the advertisers with a maximum time period allowed for advertising. Further, the media server 115 is also configured to switch the insertion of the targeted advertisement between at least one of a live studio feed, a central network feed and a local feed. Furthermore, the media server 115 is also operable to generate a Mark-in and a Mark-out montage. The Mark-in and the Mark-out montage are used to specify a start time and an end time for inserting the targeted advertisement within the television channel.

The edge device 110a and the edge device 110b are connected to the media server 115 through the network 105 to fetch one or more advertisements specific to a user from the media server 115. The edge device 110a can also fetch the television or radio content from a local or remote broadcasting studio. The edge device 110a can further integrate the one or more advertisements and the television or radio content within a central network feed that is generated at the broadcasting studio.

The edge device 110a and the edge device 110b can be deployed in one or more distributing stations. Examples of distributing stations include, but are not limited to, central studio, regional Multiple System Operators (MSO) head ends, LCO distribution points, Direct to Home (DTH) up-linking centers, FM Radio Stations and Local Community Radio Stations.

In one example, if the edge device 110a is deployed at the central studio, then the one or more advertisements fetched by the edge device 110a are inserted in the central network feed. At the central studio, the edge device 110a can be integrated with a standard play-out system for inserting the one or more advertisements.

In another example, if the edge device 110a is deployed at a television channel distributor such as the regional MSO head-ends, or at the LCO distribution points or at the DTH up-linking centers, then the one or more advertisements fetched by the edge device 110a for inserting into the television channel are meant for a specific set of users subscribed with the television channel distributor.

In yet another example, if the edge device 110a is deployed at a local radio channel distributor such as an FM or an AM Radio Station or a Local Community Radio Station, then the one or more advertisements fetched by the edge device 110a for inserting into the radio channel are meant for a specific set of users subscribed with the local radio channel distributor. The edge device 110a is also configured to detect the Mark-in and the Mark-out montage generated by the media server 115 to synchronize the insertion of the targeted advertisement within the television content of the television channel.

The edge device 110a is further configured to insert a full screen video advertisement or audio advertisement on the central network feed from the central studio in a synchronized fashion dynamically. The edge device 110a is further configured to switch insertion of the one or more advertisements between at least one of a live studio feed, the central network feed and a local feed. The switching may be scheduled by including the Mark-In and the Mark-Out Montage downloaded in advance from the media server 115 which is television channel specific in the television content. In case of a radio channel, a Radio Jingle which is radio channel specific in the radio content may be used to perform the function of the Mark-In and the Mark-Out Montage. The Mark-In and the Mark-Out Montage contain pre-determined audio cue-tones or image patterns that are detected by the edge device 110a to synchronize the switching of an outgoing network feed between one of the live studio feed, the incoming central network feed and one or more advertisements fetched from the media server 115. The Mark-In and the Mark-Out Montage are played in the beginning until the one or more advertisements are inserted in the outgoing network feed. Similarly, the Mark-In and the Mark-Out Montage are played in the end, when the outgoing network feed switches back to an incoming central network feed or the live studio feed. The Mark-In and the Mark-Out Montage downloaded in advance from the media server 115 can be embedded in the incoming central network feed and the local feed by a studio editor at various distributing stations.

The edge device 110a is also configured to perform a remote over-laying of the banner advertisement on the television content in selected positions of the television screen.

The edge device 110*a* further controls a display of the banner advertisement based on a number of desired insertions to avoid a continuous display of the banner advertisement during an airing of the television content.

The user interface 120 is configured to receive a media plan as an input from the advertiser. The media plan defines various attributes in accordance with which the one or more advertisements are played. Examples of various attributes include, but are not limited to, geographical area, a television or radio content genre viewed or listened to by various users, inventory availability based on number of insertions required, day-parts, days of the week, calendar days, needs of various users and the like. The media plan further includes a television program schedule received from a studio editor. The user interface 120 is also used to input the profiles associated with multiple advertisers.

Figure 2:
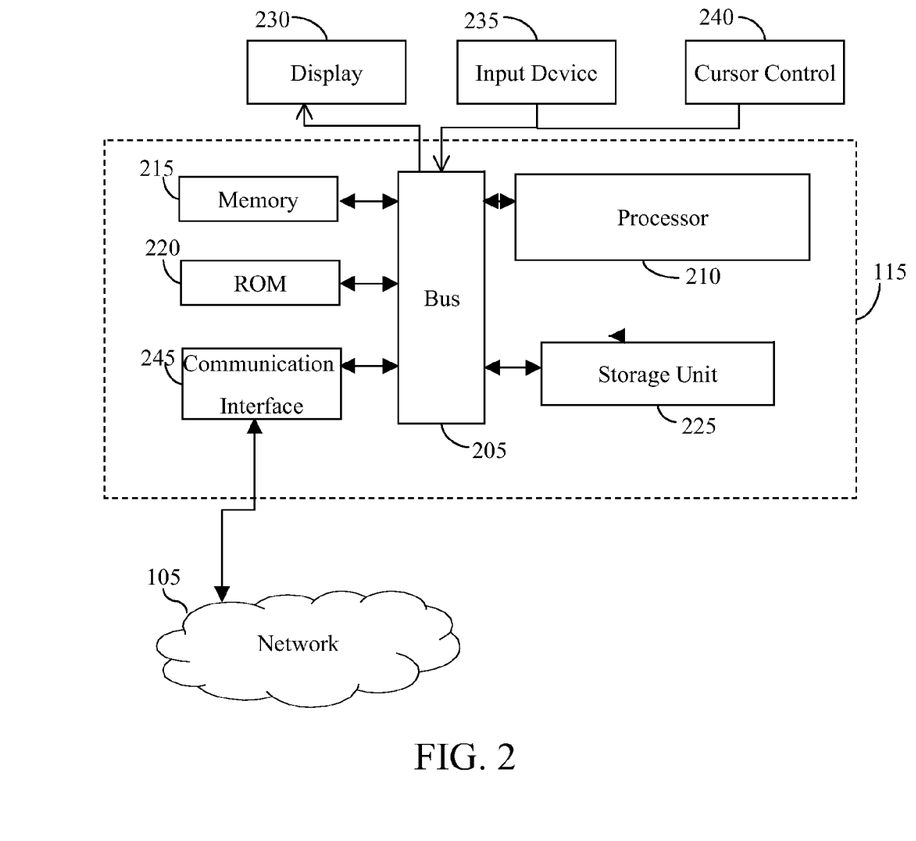
FIG. 2 is a block diagram of a media server for integrating a media plan and a targeted advertisement into a television channel, in accordance with an embodiment.

The media server 115 including a plurality of elements is explained in detail m conjunction with FIG. 2.

FIG. 2 is a block diagram of a media server for integrating a media plan and a targeted advertisement into a television channel, in accordance with one embodiment.

The media server 115 includes a bus 205 or other communication mechanism for communicating information, and a processor 210 coupled with the bus 205 for processing information. The media server 115 also includes a memory 215, for example, a random access memory (RAM) or other dynamic storage device, coupled to the bus 205 for storing information and instructions to be executed by the processor 210. The memory 215 can be used for storing temporary variables or other intermediate information during the execution of instructions by the processor 210. The media server 115 further includes a read only memory (ROM) 220 or other static storage device coupled to the bus 205 for storing static information and instructions for the processor 210. A storage unit 225, such as a magnetic disk or optical disk, is provided and coupled to the bus 205 for storing information, such as information associated with a one or more targeted advertisement, various television or radio contents and a list of television or radio channels.

The media server 115 can be coupled via the bus 205 to a display 230, for example a cathode ray tube (CRT), for playing the one or more targeted advertisements. The input device 235, including alphanumeric and other keys, is coupled to the bus 205 for communicating information and command selections to the processor 210. Another type of user input device is the cursor control 240, for example, a mouse, a trackball, or cursor direction keys, for communicating direction information and command selections to the processor 210 and for controlling cursor movement on the display 230.

The various embodiments herein are related to the use of the media server 115 for implementing the techniques described herein. In some embodiments, the techniques are performed by the media server 115 in response to the processor 210 executing instructions included in the memory 215. Such instructions can be read into the memory 215 from another machine-readable medium, for example, the storage unit 225. The execution of the instructions included in the memory 215 causes the processor 210 to perform the process steps described herein.

In some embodiments, the processor 210 can include one or more processing units for performing one or more functions of the processor 210. The processing units are Hardware circuitry used in place of or in combination with software instructions to perform specified functions.

The term "machine-readable medium" as used herein refers to any medium that participates in providing data that causes a machine to perform a specific function. In an embodiment implemented using the media server 115, various machine-readable media are involved, for example, in providing instructions to the processor 210 for execution. The machine-readable medium can be a storage medium, either volatile or non-volatile. A volatile medium includes, the memory 215 such as, dynamic memory. A non-volatile medium includes, the storage unit 225, for example, optical or magnetic disks. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punch cards, paper tape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that include the bus 205. Transmission media can also take the form of acoustic or light waves, such as those generated during radio-wave and infra-red data communications. Examples of machine-readable media may include, but are not limited to, a carrier wave as described herein after or any other media from which the media server 115 can read. For example, the instructions can initially be carried on a magnetic disk of a remote computer. The remote computer can load the instructions into its dynamic memory and send the instructions over a telephone line using a modem. A modem local to the media server 115 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The media server 115 also includes a communication interface 245 coupled to the bus 205. The communication interface 245 provides a two-way data communication coupling to the network 105. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. In any such implementation, the communication interface 245 sends and receives electrical, electromagnetic or optical signals that carry digital data streams representing various types of information.

The processor 210 in the media server 115 receives a media plan from an advertiser. The processor 210 also maintains a list of television or radio channels on which one or more targeted advertisements can be inserted. The advertiser selects one of a television or radio channel from the list. The processor 210 further schedules the one or more targeted advertisements for distribution on the selected television or radio channel. The edge device 110*a* fetches the targeted advertisement from the media server 115 and further inserts the one or more targeted advertisements into the outgoing network feed of the television or radio channel based on a media plan. The edge device 110*a* synchronizes the insertion of the one or more targeted advertisements in the incoming channel feed upon receiving the Mark-In and the Mark-Out Montage. The edge device 110*a* can also include a plurality of elements similar to the elements of the media server 115 described in FIG. 2 for performing various functions for integrating one or more targeted advertisement on the television or the radio channel based on the media plan.

Figure 3:
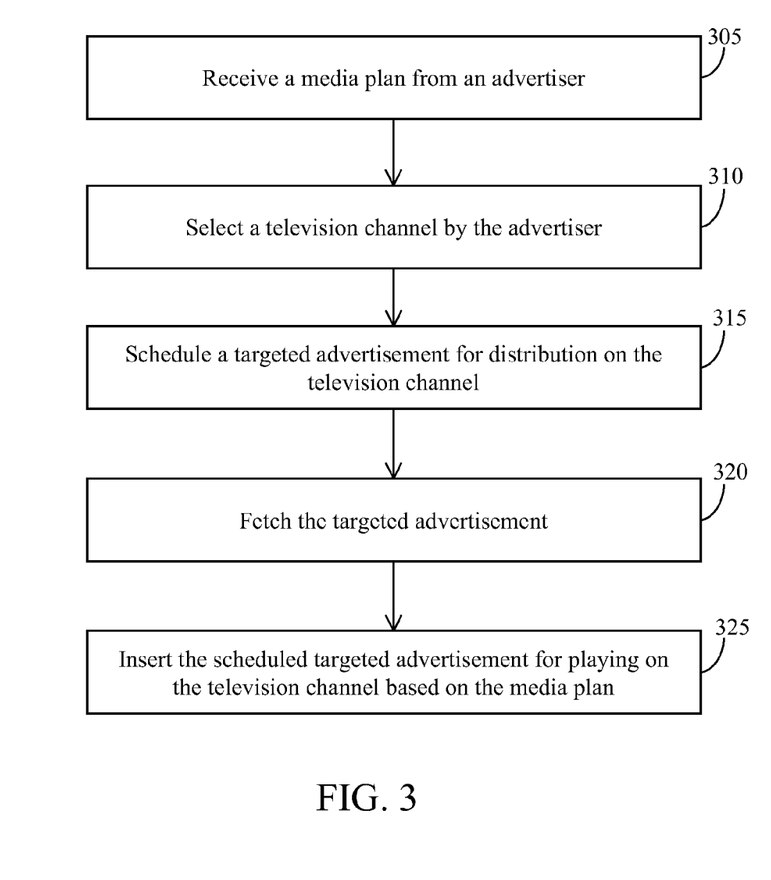
FIG. 3 is a flowchart illustrating a method of integrating a media plan and targeted advertisement into a television channel, in accordance with an embodiment.

FIG. 3 is a flowchart illustrating a method of integrating a media plan and a targeted advertisement into a television channel, in accordance with an embodiment.

At step 305, a media plan is received from an advertiser. The user interface device is used to receive the media plan as an input from the advertiser. The media plan defines various ways of distributing one or more targeted advertisements such that relevant advertisement is provided to users, thereby increasing a viewership of the one or more targeted advertisements. The media plan can be made based on a geographical area, various television or radio channels available, television or radio program genres, inventory availability based on the number of insertions required in various day-parts, days of the week, calendar days and type of advertising.

Further, a profile associated with the advertiser can also be received as an input by the user interface device. The profile, in one example, defines a television channel in which an advertisement of the advertiser can be distributed. In another example, the profile can define a television program during which an advertisement of the advertiser can be distributed.

At step 310, a television channel is selected by the advertiser. The television channel is selected based on a television program schedule received from a studio editor. The advertiser can browse the television program schedule to identify various television contents played on various television channels and further can select the television channel for inserting the one or more targeted advertisements. The media server maintains a list of television channels from which the advertiser can select the television channel for inserting the one or more targeted advertisements. Selection of the television channel by the advertiser can be performed using the user interface device. Selection is performed to ensure the one or more targeted advertisements that cater to the taste and needs of the users are viewed, thereby increasing a viewership rating of the targeted advertisements.

Furthermore, a television content can also be selected by the advertiser. The one or more targeted advertisements can be inserted into the selected television content. Hence, the one or more targeted advertisements can be viewed by users watching the selected television content, thereby increasing a viewership rating of the targeted advertisements.

At step 315, a targeted advertisement is scheduled for distribution on the television channel selected by the advertiser. The scheduling can be performed by the media server. The scheduling is performed to obtain an increased viewership of the one or more targeted advertisements. The media server identifies various needs of the user based on geographical area, various television contents viewed by the user and various television channels available for distributing the one or more targeted advertisement, availability of inventory based on number of exposures required, day-parts, days of the week, calendar days and other similar user needs. Upon identifying the needs, the one or more targeted advertisements relevant to the user are scheduled for distribution on various television channels.

The one or more targeted advertisement may be scheduled prior to distribution on the selected television channels. The one or more targeted advertisement can further be scheduled based on the availability of the advertisement time inventory prior to distribution on the television channel. The media server can be placed on a cloud network, thereby enabling a remote scheduling of the one or more targeted advertisement for distribution as desired by the advertiser.

Further, a plurality of targeted advertisements is compiled from a plurality of advertisers for playing on one or more television channels. The compiling enables the advertisers to select a specific television channel for playing a specific advertisement. Furthermore, a Mark-in and a Mark-out montage are generated to synchronize the insertion of the targeted advertisement within a program schedule of the television channel.

The method further includes monitoring one or more television channels and one or more television contents for synchronizing the insertion of the one or more targeted advertisement into selected television channels and selected television contents. Furthermore, the method includes scheduling a switch-over, for inserting the one or more between a live studio feed, the central network feed and a local feed. The switching may be scheduled by including the Mark-In and the Mark-Out Montage which is television channel specific in the television content. The Mark-In and the Mark-Out Montage are played in the beginning until the one or more advertisements are inserted and played on an outgoing network feed. Similarly, the Mark-In and the Mark-Out Montage are played at the end when the outgoing network feed switches back to the central network feed or the live studio feed. The Mark-In and the Mark-Out Montage can be embedded in the live studio feed, the central network feed and the local feed by a studio editor at various distributing stations.

In one embodiment, the one or more targeted advertisements are scheduled for distribution on the central network feed.

In some embodiments, a banner advertisement can be scheduled for over-laying on a television content in selected positions of a television screen.

In other embodiments, scheduling of a full screen video advertisement on a central network feed from central studios in a synchronized fashion is performed.

In other embodiments, scheduling of an audio advertisement on a central network feed from central studios in a synchronized fashion is performed.

At step 320, a targeted advertisement that is scheduled is fetched from the media server. The fetching of the targeted advertisement from the media server can be performed by the edge device that can be deployed in various distribution stations. The media server includes an advertisement server for storing various advertisements. The targeted advertisement can be fetched by the edge device from the advertisement server included in the media server. The targeted advertisement fetched by the edge device is used for distributing.

In one embodiment, the television content can also be fetched from broadcasting studios to perform a range of functions that enables seamless integration of the one or more targeted advertisements and the television content specific to a geographical location into the central network feed.

In some embodiments, the banner advertisement that is scheduled is fetched from the media server for over-laying on the television content in selected positions of the television screen.

In other embodiments, a full screen video advertisement is fetched for distributing it on the central network feed from the central studio in a synchronized fashion.

In other embodiments, an audio advertisement is fetched for distributing it on the central network feed from the central studio in a synchronized fashion.

At step 325, the targeted advertisement fetched is inserted on the television channel for playing. The targeted advertisement is inserted on the media server for distribution on the television channel.

In one example, the one or more targeted advertisements are inserted in the central network feed if the edge device is deployed at the central studio. The method further includes, integrating the edge device with a standard play-out system at the central studio for inserting the one or more targeted advertisements.

In another example, the one or more targeted advertisements are inserted into a television channel that are viewed by a specific set of users subscribed with a television channel distributor such as the regional MSO head-ends, or at the LCO distribution points or at the DTH up-linking centers, if the edge device is deployed at the television channel distributor.

In some embodiments, the banner advertisement fetched is inserted on the television channel for display.

In other embodiments, a full screen video advertisement is inserted on the central network feed from the central studio in a synchronized fashion.

In another embodiment, an audio advertisement is inserted into a radio channel.

In one embodiment, the method described in FIG. 3 can be performed to integrate a media plan and an audio advertisement into a radio channel. The advertiser can select a radio channel for distributing the audio advertisement. The media server, maintains a list of radio channels from which the advertiser can select the radio channel for inserting the audio advertisement. Upon selecting the radio channel, the audio advertisement is scheduled for distribution. Further, one or more radio channels and one or more radio contents are monitored for synchronizing the insertion of the audio advertisement into selected radio channels and selected radio contents. Based on the scheduling, the audio advertisement is fetched from the media server. The audio advertisement is fetched by the edge device that can be deployed at a local radio channel distributor such as an FM or an AM Radio Station or a Local Community Radio Station. The audio advertisement fetched is distributed on the selected radio channel. Further, upon fetching, the audio advertisement is inserted on the radio channel for playing. The audio advertisement is inserted on the media server for playing on the radio channel.

The system specified in the present disclosure enables integration of one or more targeted advertisement into a television or a radio content based on a media plan. The system forms a powerful platform for advertisement aggregation, content delivery, network management, media planning and reporting platform for advertisers. The system also serves as an intelligent interface between the advertisers (local advertisers/national advertisers) and the television or the radio channels to aggregate and insert relevant advertisements into the television channels to create additional revenue opportunities. The system further can be laid on a cloud network with adequate elasticity to meet the needs of growing network of customized television channels. The system further enables inserting an audio advertisement into a radio network.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

The invention claimed is:

1. A system for integrating a media plan and a targeted advertisement into a television channel, the system comprising:
   a user interface for receiving the media plan from an advertiser and a television program schedule from a studio editor;
   a media server, and wherein the media server comprises a memory that stores instructions and a processor, and wherein the processor, in responsive to the instructions, integrates the television program schedule and a one or more targeted advertisements based on the received media plan, and generates a Mark-in and a Mark-out montage to match a duration of the one or more targeted advertisements to be inserted within a television channel, and wherein the Mark-in and the Mark-out montage contains predetermined audio cue tones or image patterns and wherein the Mark-in and the Mark-out montage are television channel specific, and wherein the media server is on a cloud network; and
   one or more edge devices for fetching the one or more targeted advertisements, detecting the Mark-in and the Mark-out montage to synchronize the insertion of the one or more targeted advertisements within a television content of the television channel and inserting the targeted advertisement into the television channel and wherein the one or more edge devices is to insert a full screen video advertisement dynamically on the television channel or wherein the edge device is to insert a banner advertisement dynamically on the television channel, and wherein the one or more edge devices control a display of banner advertisements based on a number of desired insertions to avoid a continuous display of banner advertisements during an airing of a television content, and wherein the media server schedules the banner advertisements that are overlaid-on the television content on a selected portion of the television screen.

2. The system as claimed in claim 1, wherein the media plan is based on at least one of a geographical area, the television content, availability of the one or more targeted advertisements, and a television program schedule received from the studio editor.

3. The system as claimed in claim 1, wherein the one or more edge devices are deployed on a plurality of distribution stations.

4. The system as claimed in claim 1, wherein the processor further responsive to the instructions, schedule the targeted advertisement for insertion into the television program schedule of the television channel and switches the insertion of the targeted advertisement between at least one of a live studio feed, a central network feed and a local feed.

5. The system as claimed in claim 1, wherein the edge device is further used to insert an audio advertisement on a radio channel dynamically.

6. A method for integrating a media plan and a targeted advertisement into a television channel, the system comprising:
receiving a media plan from an advertiser;
selecting a television channel by the advertiser;
scheduling of the targeted advertisement for distribution on the selected television channel;
fetching the targeted advertisement; and
inserting the targeted advertisement for playing on the selected television channel based on the media plan and wherein the targeted advertisement is inserted by a media server and wherein the media server is on a cloud network, and wherein a full screen video advertisement is inserted dynamically on the television channel, and wherein a banner advertisement is inserted on the television channel dynamically, and wherein a display of banner advertisements is controlled based on a number of desired insertions to avoid a continuous display of banner advertisements during an airing of a television content, and wherein the one or more banner advertisements are overlaid-on the television content on a selected portion of the television screen.

7. The method as claimed in claim 6, wherein scheduling comprises compiling a plurality of targeted advertisements from a plurality of advertisers for playing on one or more television channels and generating a Mark-in and Mark-out montage to synchronize the insertion of the targeted advertisement within a television program schedule of the television channel, and wherein the Mark-in and the Mark-out montage contains predetermined audio cue tones or image patterns, and wherein the Mark-in and the Mark-out montage are television channel specific.

8. The method as claimed in claim 6, wherein the targeted advertisement is inserted upon detecting the Mark-in and the Mark-out montage.

9. The method as claimed in claim 6, wherein scheduling of the targeted advertisement is based on at least one of a geographical area, television channel of a television program genre, availability of inventory based on number of exposures required, day-parts, days of the week and calendar days.

10. The method as claimed in claim 6, further comprises fetching a television content from at least one of a plurality of broadcasting studios and a plurality of content servers.

11. The method as claimed in claim 6, further comprises monitoring the television content to synchronize the insertion of the targeted advertisement.

12. The method as claimed in claim 6, wherein the insertion of the targeted advertisement is performed from a remote location.

13. The method as claimed in claim 6, comprises integrating the media plan and an audio advertisement into a radio channel.

* * * * *